US009664315B1

(12) United States Patent
Ryu et al.

(10) Patent No.: US 9,664,315 B1
(45) Date of Patent: May 30, 2017

(54) ONE-WAY NUT FASTENER

(71) Applicant: Samsung Electronics Co., Ltd., Suwon-Si, Gyeonggi-Do (KR)

(72) Inventors: Jaewoo Ryu, Hwaseong-si (KR); Changsoo Kim, Yongin-si (KR); Bongwon Seo, Hwaseong-si (KR); Bonghee Lee, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 330 days.

(21) Appl. No.: 14/464,355

(22) Filed: Aug. 20, 2014

(51) Int. Cl.
*F16L 15/08* (2006.01)

(52) U.S. Cl.
CPC .................................... *F16L 15/08* (2013.01)

(58) Field of Classification Search
CPC ...... F16L 15/08; B25B 23/14; B25B 23/1415; B25B 23/1427; B25B 23/1425; B25B 23/142
See application file for complete search history.

(56) References Cited

U.S. PATENT DOCUMENTS 1,707,856 A * 4/1929 Hoffman ................. B25B 13/48 81/176.3
1,925,219 A * 9/1933 Weigt ...................... G01L 5/288 73/131
2,476,369 A * 7/1949 Gutowski ............... B25B 13/28 81/90.1
2,618,996 A * 11/1952 Logan ..................... B25B 13/08 81/111
3,142,744 A * 7/1964 Keck .................... H01H 23/141 200/331
3,701,295 A * 10/1972 Mende .................... B25B 23/14 16/225
4,115,669 A * 9/1978 Cali ......................... H01H 3/04 16/429
4,534,245 A * 8/1985 Rossmann .............. B25B 13/46 81/111
4,646,378 A * 3/1987 Borden .................. A62B 3/005 7/138
5,297,459 A * 3/1994 Stojanowski ........... B25B 13/46 81/158
5,337,638 A * 8/1994 Coss .................. A61B 17/8883 173/176
5,467,674 A * 11/1995 Thorn ..................... B25B 23/15 81/467

(Continued)

FOREIGN PATENT DOCUMENTS

JP 4266132 B2 5/2009
KR 100614815 B1 8/2006

(Continued)

*Primary Examiner* — David B Thomas
(74) *Attorney, Agent, or Firm* — Harness, Dickey and Pierce, P.L.C.

(57) ABSTRACT

A one-way nut fastener includes a head portion having a first head portion provided with an opening and a second head portion and a handle portion connected to the head portion. When the head portion is rotated in a first direction, the head portion rotates along with a nut, which is installed on a pipe line and disposed in the opening, in the first direction. When the head portion is rotated in a second direction opposite to the first direction, the second head portion may be bent in the second direction at an angle from the first head portion.

20 Claims, 5 Drawing Sheets

(56) References Cited

U.S. PATENT DOCUMENTS

| | | | | | |
|---|---|---|---|---|---|
| 5,524,505 | A * | 6/1996 | Lawrence | B25G 1/043 16/427 |
| 5,630,344 | A * | 5/1997 | Nammoto | B25B 13/28 81/111 |
| 5,655,420 | A * | 8/1997 | Ogawa | B25B 23/14 81/467 |
| 5,890,404 | A * | 4/1999 | Stojanowski | B25B 13/12 81/158 |
| 6,138,539 | A * | 10/2000 | Carchidi | B25B 23/1415 81/467 |
| 6,295,901 | B1 * | 10/2001 | Mardirossian | B25B 13/48 81/119 |
| 7,107,884 | B2 | 9/2006 | Cutler et al. | |
| 7,475,605 | B2 | 1/2009 | Shiao | |
| 7,806,027 | B1 * | 10/2010 | Gao | B25B 13/463 81/482 |
| 8,495,935 | B2 * | 7/2013 | Mountz | G01L 5/24 81/467 |
| 2002/0078799 | A1 * | 6/2002 | Friedman | B25B 13/08 81/125.1 |
| 2005/0044999 | A1 * | 3/2005 | Slepekis | B25B 13/14 81/157 |
| 2005/0072278 | A1 | 4/2005 | Cutler et al. | |
| 2007/0180960 | A1 * | 8/2007 | Cutler | B25B 23/1427 81/478 |
| 2007/0214914 | A1 * | 9/2007 | Andersin | A61B 17/862 81/60 |
| 2008/0156111 | A1 | 7/2008 | Shiao | |
| 2010/0126318 | A1 | 5/2010 | Aldecoa | |
| 2012/0240735 | A1 | 9/2012 | Tsai et al. | |
| 2012/0255404 | A1 | 10/2012 | Chang et al. | |
| 2012/0279365 | A1 | 11/2012 | Cummings et al. | |
| 2012/0312132 | A1 | 12/2012 | Li et al. | |
| 2013/0110244 | A1 | 5/2013 | Siedler et al. | |
| 2014/0144300 | A1 * | 5/2014 | Marchand | B25B 13/065 81/467 |
| 2014/0230613 | A1 * | 8/2014 | Hsieh | B25B 13/04 81/177.9 |
| 2014/0338419 | A1 * | 11/2014 | Hsieh | B25B 13/00 73/1.12 |

FOREIGN PATENT DOCUMENTS

| | | | |
|---|---|---|---|
| KR | 100882107 | B1 | 2/2009 |
| KR | 20100128432 | A | 12/2010 |
| KR | 20110095333 | A | 8/2011 |

* cited by examiner

ONE-WAY NUT FASTENER

BACKGROUND

Example embodiments of the inventive concepts relate to a one-way nut fastener, and in particular, to a one-way nut fastener capable of preventing a nut from being loosened from a gas pipe line to prevent a gas leak from the gas pipe line by an operator's mistake.

In a semiconductor fabrication plant, there are many pipe lines to deliver process gases. Since some of such process gases are toxic and flammable, an accident such as gas leak causes severe and dangerous environmental pollution. The gas leak accident may be caused by vibration of the pipe lines, when a pipe fitting loosely fastened by a nut is used to connect the pipe lines to each other. In addition, the gas leak accident may also occur when an operator turns to loosen the nut of the pipe fitting by mistake.

SUMMARY

Example embodiments of the inventive concepts provide a one-way nut fastener capable of preventing a nut, which is installed on a pipe fitting between pipe lines, from being unintentionally loosened.

According to some example embodiments of the inventive concepts, a one-way nut fastener may include a head portion having a first head portion provided with an opening and a second head portion and a handle portion connected to the head portion. When the head portion is rotated in a first direction, the head portion rotates along with a nut in the first direction, which is installed on a pipe line and inserted in the opening. When the head portion is rotated in a second direction opposite to the first direction, the second head portion may be bent in the second direction at an angle from the first head portion.

In some example embodiments, the head portion may be configured in such a way that the second head portion is bent within a range of 10-120 degrees relative to a central axis of the first head portion, when the head portion is rotated in the second direction opposite to the first direction.

In some example embodiments, the first direction may be a rotation direction of an operation for fastening the nut, and the second direction opposite to the first direction may be a rotation direction of an operation for loosening the nut.

In some example embodiments, the one-way nut fastener may further include a torque controlling portion connected to the handle portion.

In some example embodiments, the torque controlling portion may be configured to be able to apply a torque ranging from 1 to 2 Nm to the nut.

In some example embodiments, the torque controlling portion may be configured in such a way that a torque of about 1.5 Nm is exerted on the nut.

In some example embodiments, the head portion may be formed of stainless steel, titanium, plastics, or a combination thereof.

In some example embodiments, the nut may be provided in a form of an internal thread nut configured to fasten a pipe fitting between at least two pipe lines.

In some example embodiments, the pipe fitting may be provided in a form of an external thread nut.

In some example embodiments, the first head portion may include an end including the opening, in which the nut is inserted, another end including first and second protruding portions, and a first head body connecting the end to the another end. The first and second protruding portions may be spaced apart from each other to define a groove.

The first head body may include a first contact surface and an inclined surface, which are adjacent to the groove and are connected to each other to form a predetermined (or desired) angle.

In some example embodiments, the second head portion may include an inserting portion inserted in the groove of the first head portion, and a second head body extending from the inserting portion.

The inserting portion may include a second contact surface in contact with the first contact surface and a rounding surface connected to the second contact surface.

In some example embodiments, the one-way nut fastener may further include adhesive members provided on the first and second contact surfaces, respectively.

In some example embodiments, a portion of the groove adjacent to the first contact surface of the first head portion may have a depth smaller than another portion of the groove adjacent to the inclined surface of the first head portion.

In some example embodiments, a portion of the inserting portion adjacent to the second contact surface may have a width smaller than another portion of the inserting portion adjacent to the rounding surface.

In some example embodiments, the one-way nut fastener may further include a connection pin connecting the first and second head portions to each other. Each of the first and second protruding portions and the inserting portion may be formed to have a through-hole, in which the connection pin is provided.

In some example embodiments, the head portion and the handle portion may be removably connected to each other.

In some example embodiments, the head portion may be configured to be replaceable with another one suitable for a structure of the nut.

In some example embodiments, each of the first and second contact surfaces may be flat, the rounding surface may be curved at a predetermined (or desired) curvature, and the inclined surface may be flat and/or curved.

In some example embodiments, the one-way nut fastener further comprise a torque controlling portion which is set to a predetermined (or desired) torque value and is configured to fasten the nut at the predetermined (or desired) torque value by rotating the nut in the first direction.

In some example embodiments, the one-way nut fastener may be configured to prevent the nut from being loosened in the second direction opposite to the first direction.

BRIEF DESCRIPTION OF THE DRAWINGS

Example embodiments will be more clearly understood from the following brief description taken in conjunction with the accompanying drawings. The accompanying drawings represent non-limiting, example embodiments as described herein.

Figure 1:
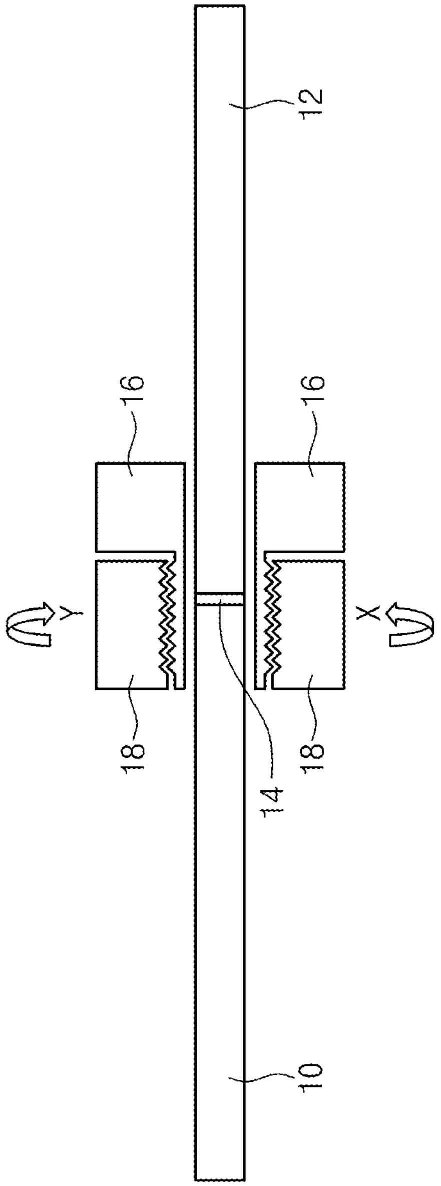
FIG. 1 illustrates a cross-sectional view of a pipe fitting and a nut for connecting gas pipe lines.

It should be noted that these figures are intended to illustrate the general characteristics of methods, structure and/or materials utilized in some example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION

Example embodiments of the inventive concepts will now be described more fully with reference to the accompanying drawings, in which example embodiments are shown. Example embodiments of the inventive concepts may, however, be embodied in many different forms and should not be construed as being limited to the embodiments set forth herein; rather, these embodiments are provided so that this disclosure will be thorough and complete, and will fully convey the concepts of example embodiments to those of ordinary skill in the art. In the drawings, the thicknesses of layers and regions are exaggerated for clarity. Like reference numerals in the drawings denote like elements, and thus their description will be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Like numbers indicate like elements throughout. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments of the inventive concepts belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Although corresponding plan views and/or perspective views of some cross-sectional view(s) may not be shown, the cross-sectional view(s) of device structures illustrated herein provide support for a plurality of device structures that extend along two different directions as would be illustrated in a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. For example, when a device structure (e.g., a memory cell structure or a transistor structure) is illustrated in a cross-sectional view, an electronic device may include a plurality of the device structures (e.g., memory cell structures or transistor structures), as would be illustrated by a plan view of the electronic device. The plurality of device structures may be arranged in an array and/or in a two-dimensional pattern.

Figure 2A:
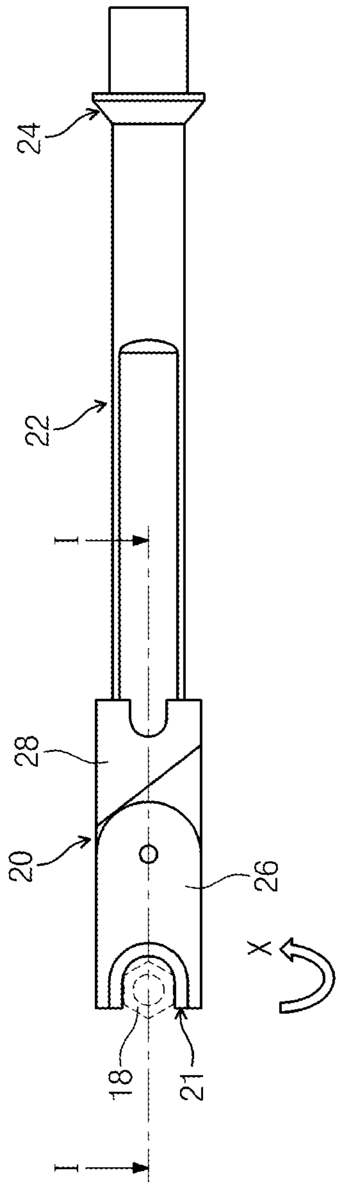
FIG. 2A illustrates a cross-sectional view of a one-way nut fastener rotating in a direction (e.g., X direction) of a nut fastening operation, according to some example embodiments of the inventive concepts.

FIG. 1 illustrates a cross-sectional view of a pipe fitting and a nut for connecting gas pipe lines. FIG. 2A illustrates a cross-sectional view of a one-way nut fastener rotating in a direction (X direction) of a nut fastening operation, according to example embodiments of the inventive concept, and FIG. 2B illustrates a cross-sectional view of the one-way nut fastener rotating in a direction (Y direction) of a nut loosening operation, according to some example embodiments of the inventive concepts.

The one-way nut fastener according to some example embodiments of the inventive concepts will be described with reference to FIGS. 1, 2A, and 2B. Referring to FIG. 1, a pipe fitting 16 may be provided to enclose each end of two pipe lines 10 and 12 through which gas or fluid flows. In some embodiments, the gas or fluid may be toxic and flammable. The pipe fitting 16 may be provided in the form of an external thread nut. A gasket 14 may be provided between the pipe lines 10 and 12 to prevent a gas leak from a joint region between the two pipe lines 10 and 12. A nut 18 may be provided to enclose the pipe fitting 16. The nut 18 may be provided in the form of an internal thread nut. Hereinafter, a term "X direction" will refer to a direction of a fastening operation of the nut 18, while a term "Y direction" will refer to a direction of a loosening operation of the nut 18. In some example embodiments, the X and Y directions may be opposite to each other. In the case where the nut 18 is rotated in the X direction, the pipe fitting 16 may press tightly against the joint region between the pipe lines 10 and 12. In the case where the nut 18 is rotated in the Y direction, the pipe fitting 16 may be spaced apart from the joint region between the pipe lines 10 and 12.

Figure 2B:
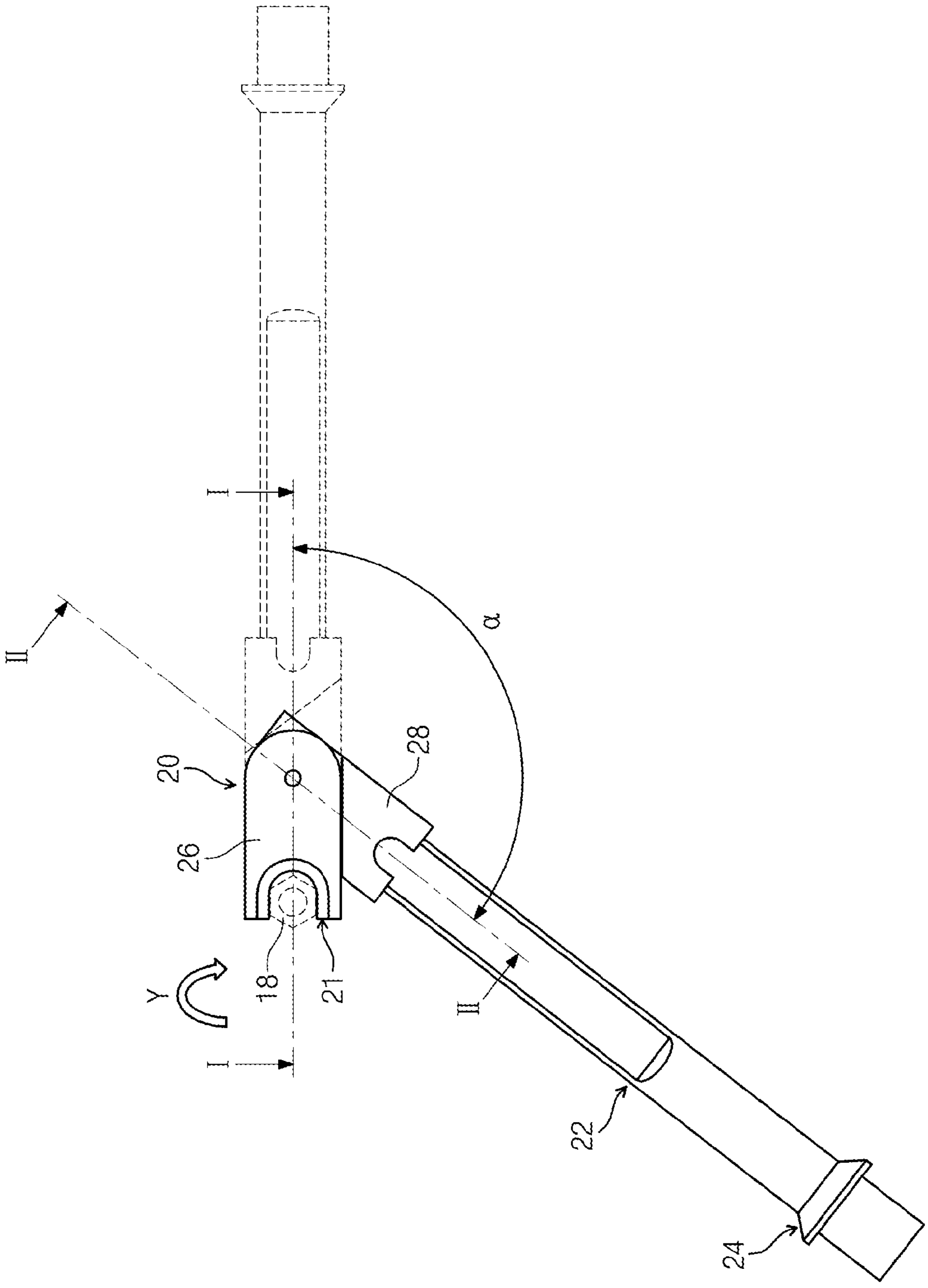
FIG. 2B illustrates a cross-sectional view of the one-way nut fastener rotating in a direction (e.g., Y direction) of a nut loosening operation, according to some example embodiments of the inventive concepts.

Referring to FIGS. 2A and 2B, according to some example embodiments of the inventive concepts, the one-way nut fastener may be applicable to a torque wrench, but some example embodiments of the inventive concepts may not be limited thereto. For example, the one-way nut fastener may also be applicable to a common wrench. In general, the torque wrench may be configured to have an adjustable torque. Here, the torque or a torsional moment is the tendency of a force to rotate the nut about an axis and has a dimension of newton meter (Nm). As described above, in the case where the nut 18 is loosely connected to the pipe lines 10 and 12, the nut 18 may be loosed from the pipe lines 10 and 12 by vibration of the pipe lines 10 and 12. To reduce or prevent such a loosening of the nut 18, it is necessary to tightly fasten the nut 18 provided in the form of the internal thread to the pipe fitting 16 provided in the form of the external thread. For example, if the nut 18 is applied with a torque corresponding to a grip strength (e.g., of 1.0 Nm or lower) of a male adult, the nut 18 may be loosely fastened to the pipe fitting 16. In contrast, if a torque greater than 2.0 Nm is exerted on the nut 18, the one-way nut fastener may be broken or damaged. In other words, in the case where the torque exerted on the nut 18 is in a range of 1-2 Nm, it is possible to tightly fasten the nut 18 to the pipe fitting 16, without any damage of the fastener. In some example embodiments, the torque exerted on the nut 18 may be about 1.5 Nm.

It may be difficult to exactly examine whether the nut 18 is normally fastened to the pipe fitting 16. Therefore, in the case where a nut fastening operation is performed using a predetermined (or desired) torque, it is possible to tightly fasten the nut 18. Further, if a nut loosening operation is unintentionally performed by an operator's mistake, it is possible to reduce or prevent the nut 18 from being loosened.

According to some example embodiments of the inventive concepts, the one-way nut fastener may include a head portion 20, a handle portion 22, and a torque controlling portion 24. The head portion 20 may include a first head portion 26 and a second head portion 28. The first head portion 26 may be provided to include an opening 21. The head portion 20 and the handle portion 22 may be removably connected to each other.

The handle portion 22 and the torque controlling portion 24 may be connected to each other. The torque controlling portion 24 may be configured to display a magnitude of a desired or exerting torque. The torque controlling portion 24 may be set by the predetermined (or desired) torque value.

The head portion 20 may be formed of, for example, stainless steel, titanium, plastic materials, or a combination thereof.

As shown in FIG. 2A, after the nut 18 connected to the pipe fitting 16 is inserted in the opening 21, the one-way nut fastener may be turned or rotated in the direction of the nut fastening operation, e.g., X direction. During this turning operation, the first and second head portions 26 and 28 may be rotated along with the nut 18, without any bending between the first and second head portions 26 and 28. For example, the first and second head portions 26 and 28 may rotate in a single body along with the nut 18 in the X direction, without any change in an angle between respective central axes thereof positioned on the same straight line I-I. Accordingly, the nut fastening operation may be normally performed. As an example, the handle portion 22 and the head portion 20 may be rotated in a single body in the X direction.

In example some embodiments, a torque value ranging from about 1.0 to 2.0 Nm may be applied to the torque controlling portion 24. As an example, a torque value applied to the torque controlling portion 24 may be substantially about 1.5 Nm. Accordingly, an operation of tightly fastening the nut 18 can be normally performed using the one-way nut fastener.

As shown in FIG. 2B, after the nut 18 connected to the pipe fitting 16 is inserted in the opening 21, the one-way nut fastener may be turned or rotated in the direction of the nut loosening operation, e.g., Y direction. Here, the second head portion 28 may be bent from the first head portion 26 by a predetermined (or desired) angle of a in the Y direction. In other words, the second head portion 28 may be bent at the predetermined (or desired) angle $\alpha$ relative to the central axis of the first head portion 26 or a direction depicted by a dotted line I-I. For example, the second head portion 28 may be oriented toward the Y direction or a direction depicted by a dotted line II-II. In this case, the nut 18 may not be rotated in the Y direction.

In some example embodiments, the predetermined (or desired) angle $\alpha$ may range from about 10 degrees to 120 degrees.

In some example embodiments, the handle portion 22 and the second head portion 28 may be bent at the predetermined (or desired) angle $\alpha$ in the Y direction. The predetermined (or desired) angle $\alpha$ may range from about 10 degrees to 120 degrees.

If the second head portion 28 is bent at the predetermined (or desired) angle relative to the first head portion 26, the nut loosening operation is no more performed by the one-way nut fastener.

Figure 3:
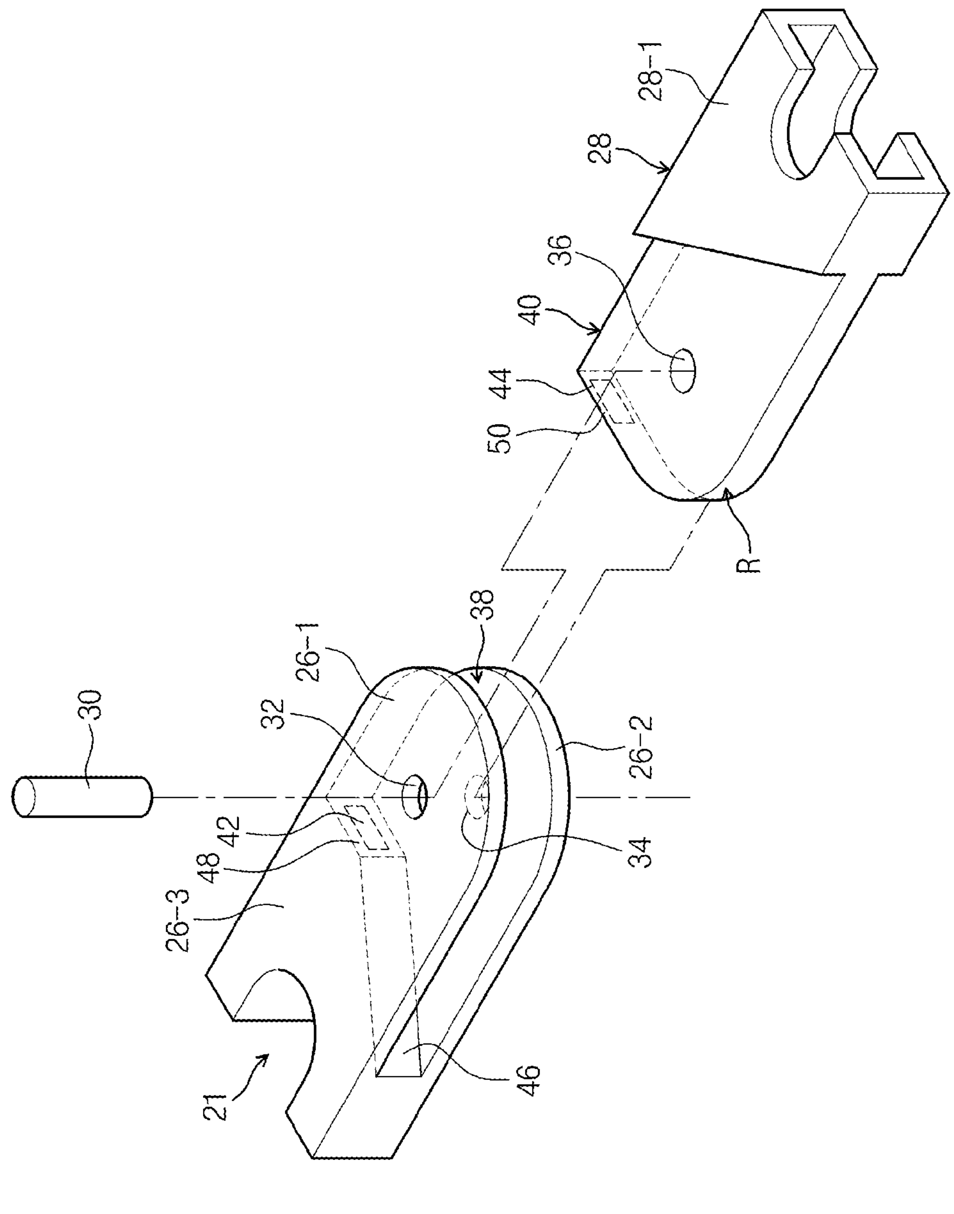
FIG. 3 illustrates a perspective view of essential parts of the one-way nut fastener, which includes a head portion having first and second head portions, according to some example embodiments of the inventive concepts.
Figure 4:
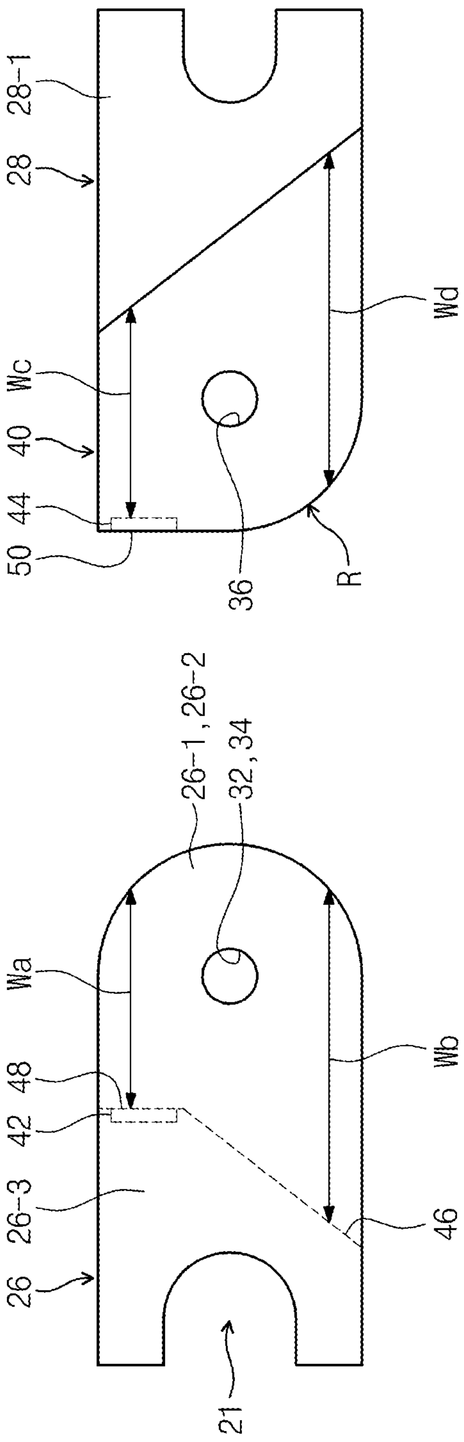
FIG. 4 illustrates a plan view of essential parts of the one-way nut fastener, which includes the head portion having the first and second head portions, according to some example embodiments of the inventive concepts.

Referring to FIGS. 3 and 4, the first head portion 26 of the head portion 20 may include two opposite ends and a first head body 26-3 therebetween. One of the two opposite ends may be configured to have an opening 21 where the nut 18 can be inserted and the other may be configured to include first and second protruding portions 26-1 and 26-2. A groove 38 may be provided between the first and second protruding portions 26-1 and 26-2.

The first head body 26-3 may include a first contact surface 48 and an inclined surface 46, which are positioned adjacent to the groove 38. For example, at least a portion of the groove 38 may be delimited by the first contact surface 48 and the inclined surface 46. In some example embodiments, the first contact surface 48 and the inclined surface 46 may be connected to each other to form a predetermined (or desired) angle.

In some example embodiments, the second head portion 28 of the head portion 20 may include a second head body 28-1 and an inserting portion 40 extending from the second head body 28-1. The inserting portion 40 may be provided at an end of the second head portion 28 and may be inserted into the groove 38 of the first head portion 26.

The inserting portion 40 may include a second contact surface 50, which is positioned at an end apart from the second head body 28-1, and a rounding surface R connected to the second contact surface 50. Here, an opposite end of the inserting portion 40 may be connected to the second head body 28-1.

A first adhesive member 42 may be provided on the first contact surface 48. A second adhesive member 44 may be provided on the second contact surface 50. The first and second adhesive members 42 and 44 may be permanent magnets.

The first contact surface 48 may be in contact with the second contact surface 50. As an example, the first adhesive member 42 may be in contact with the second adhesive member 44. Each of the first and second contact surfaces 48 and 50 may be flat, and the rounding surface R may be curved at a predetermined (or desired) curvature. Further, the inclined surface 46 may be flat or curved.

The first and second protruding portions 26-1 and 26-2 and the inserting portion 40 may have through-holes 32, 34, and 36, respectively. The head portion 20 may include a connection pin 30 provided to penetrate the through-holes 32, 34, and 36. The first and second head portions 26 and 28 may be connected to each other by the connection pin 30.

The head portion 20 may be configured to be replaceable, and thus, the head portion 20 can have a structure (e.g., shape and/or size) suitable for a structure of the nut 18. Accordingly, the head portion 20 with desired size and shape can be adaptively installed on the handle portion 22 and be used for the nut fastening operation.

Referring to FIG. 4, a portion of the groove 38 adjacent to the first contact surface 48 may have a first depth Wa (or a first width), and another portion of the groove 38 adjacent to the inclined surface 46 may have a second depth Wb (or a second width) which is greater than the first depth Wa.

A portion of the inserting portion 40 adjacent to the second contact surface 50 may have a first length Wc (or a third width), and another portion of the inserting portion 40 adjacent to the rounding surface R may have a second length Wd (or a fourth width) which is greater than the first length Wc.

In the one-way nut fastener, a predetermined (or desired) torque value may be applied to the torque controlling portion 24 and then, the nut 18 may be fastened by the predetermined (or desired) torque value through rotating the nut 18 in the direction of the nut fastening operation. If the first and second head portions 26 and 28 of the head portion 20 are bent at an angle of 10-120 degrees from each other during rotating the nut in a first direction, the nut 18 may be again rotated in in a second direction which is opposite to the first direction by the predetermined (or desired) torque of about 1.5 Nm such that the pipe fitting 16 seals hermetically a joint region between the pipe lines 10 and 12. If the first and second head portions 26 and 28 of the head portion 20 are bent each other, the one-way nut fastener may not be used to perform the loosening operation of the nut 18, and thus, the pipe fitting 16 can be prevented from being unintentionally spaced apart from the pipe lines 10 and 12.

According to some example embodiments of the inventive concepts, even when the one-way nut fastener is rotated about the nut 18 in the direction of the loosening operation that is opposite to the direction of the fastening operation, the nut 18 may not be loosened from the pipe fitting 16.

According to some example embodiments of the inventive concepts, the nut 18 installed on the pipe lines 10 and 12 is inserted in the opening 21. If the one-way nut fastener rotates the head portion 20 in one direction, the nut 18 may be rotated along with the head portion 20. By contrast, if the one-way nut fastener rotates the head portion 20 in the other direction opposite to the one direction, the first head portion 26 may be bent at the predetermined (or desired) angle relative to the second head portion 28. Accordingly, it is possible to reduce or prevent the nut 18 from being accidentally loosened by an operator and consequently reduce or prevent a gas leak accident. Further, since the torque controlling portion 24 is set in such a way that a desired torque can be exerted on the nut 18, it is possible to fasten the nut 18 tightly to the pipe fitting 16 and thereby to press the pipe fitting 16 tightly against the pipe lines 10 and 12. As a result, it is possible to reduce or prevent the nut 18 from being loosened by vibration of the pipe lines 10 and 12.

According to some example embodiments of the inventive concepts, by using the one-way nut fastener, it is possible to reduce or prevent a slack nut from being loosened from pipe lines, when the pipe lines are vibrated, and to reduce or prevent an operator from turning the nut in a direction of the loosening operation. Accordingly, a gas leak accident from the pipe line can be reduced or prevented.

While example embodiments of the inventive concepts have been particularly shown and described, it will be understood by one of ordinary skill in the art that variations in form and detail may be made therein without departing from the spirit and scope of the attached claims.

What is claimed is:

1. A one-way nut fastener, comprising:

a head portion including a first head portion and a second head portion, the first head portion comprising an opening; and a handle portion connected to the head portion, wherein, when the head portion is configured to rotate in a first direction, the head portion is configured to rotate along with a nut on a pipe line and inserted in the opening in the first direction, and when the head portion is configured to rotate in a second direction opposite to the first direction, the second head portion is configured to bend in the second direction at a first angle from the first head portion while maintaining a second angle relative to the handle.

2. The one-way nut fastener of claim 1, wherein the head portion is configured in such a way that the second head portion is configured to bend within a range of 10-120 degrees relative to a central axis of the first head portion, when the head portion is configured to rotate in the second direction opposite to the first direction.

3. The one-way nut fastener of claim 1, wherein the head portion is formed of stainless steel, titanium, plastics, or a combination thereof.

4. The one-way nut fastener of claim 1, wherein the nut is an internal thread nut configured to fasten a pipe fitting between at least two pipe lines.

5. The one-way nut fastener of claim 4, wherein the pipe fitting is an external thread nut.

6. The one-way nut fastener of claim 1, wherein the first head portion includes;

an end including the opening to configured to be inserted by the nut;

another end including first and second protruding portions; and a first head body connecting the end to the another end, wherein the first and second protruding portions are spaced apart from each other to define a groove, and the first head body includes a first contact surface and an inclined surface, which are adjacent to the groove and are connected to each other to form a predetermined third angle.

7. The one-way nut fastener of claim 6, wherein the second head portion includes:

an inserting portion inserted in the groove of the first head portion; and a second head body extending from the inserting portion, wherein the inserting portion includes a second contact surface in contact with the first contact surface and a rounding surface connected to the second contact surface.

8. The one-way nut fastener of claim 7, further comprising adhesive members on the first and second contact surfaces.

9. The one-way nut fastener of claim 7, further comprising a connection pin connecting the first and second head portions to each other, wherein each of the first and second protruding portions and the inserting portion is formed to have a through-hole provided by the connection pin therein.

10. The one-way nut fastener of claim 7, wherein each of the first and second contact surfaces are flat, the rounding surface is curved, and the inclined surface is flat and/or curved.

11. The one-way nut fastener of claim 6, wherein a portion of the groove adjacent to the first contact surface of the first head portion has a depth smaller than another portion of the groove adjacent to the inclined surface of the first head portion.

12. The one-way nut fastener of claim 11, wherein a portion of the inserting portion adjacent to the second contact surface has a width smaller than another portion of the inserting portion adjacent to the rounding surface.

13. The one-way nut fastener of claim 1, wherein the head portion and the handle portion are removably connected to each other.

14. The one-way nut fastener of claim 13, wherein the head portion is configured to be replaceable with another head portion suitable for a structure of the nut.

15. The one-way nut fastener of claim 1, wherein the one-way nut fastener further comprise a torque controlling portion configured to fasten the nut at a predetermined torque value by rotating the nut in the first direction.

16. The one-way nut fastener of claim 1, wherein the one-way nut fastener is configured to prevent the nut from being loosened in the second direction opposite to the first direction.

17. A one-way nut fastener, comprising:

a head portion including a first head portion and a second head portion, the first head portion including an opening; and a handle portion connected to the head portion, wherein, when the head portion is configured to rotate in a first direction, the head portion is configured to rotate along with a nut installed on a pipe line and inserted in the opening in the first direction, and when the head portion is configured to rotate in a second direction opposite to the first direction, the second head portion is configured to bend in the second direction at a second angle from the first head portion, and wherein the first direction is a rotation direction of an operation for fastening the nut, and the second direction opposite to the first direction is a rotation direction of an operation for loosening the nut.

18. A one-way nut fastener, comprising:

a head portion including a first head portion and a second head portion, the first head portion comprising an opening; and a handle portion connected to the head portion, and a torque controlling portion connected to the handle portion, wherein, when the head portion is configured to rotate in a first direction, the head portion is configured to rotate along with a nut installed on a pipe line and inserted in the opening in the first direction, and when the head portion is configured to rotate in a second direction opposite to the first direction, the second head portion is configured to bend in the second direction at a first angle from the first head portion.

19. The one-way nut fastener of claim 18, wherein the torque controlling portion is configured to apply a torque ranging from 1 to 2 Nm to the nut.

20. The one-way nut fastener of claim 18, wherein the torque controlling portion is configured to apply a torque of about 1.5 Nm to the nut.

* * * * *